(12) United States Patent
Dufresne et al.

(10) Patent No.: US 7,713,905 B2
(45) Date of Patent: May 11, 2010

(54) OFF-SITE TREATMENT FOR HYDROGENATION CATALYSTS

(75) Inventors: Pierre Dufresne, Valence (FR); Franck Labruyere, Saint Georges les Bains (FR); François Locatelli, Valence (FR)

(73) Assignee: Eurecat S.A., LaVoulte sur Rhone (FR)

( * ) Notice: Subject to any disclaimer, the term of this patent is extended or adjusted under 35 U.S.C. 154(b) by 877 days.

(21) Appl. No.: 10/554,873

(22) PCT Filed: Apr. 28, 2004

(86) PCT No.: PCT/FR2004/001047

§ 371 (c)(1),
(2), (4) Date: Oct. 16, 2006

(87) PCT Pub. No.: WO2004/098774

PCT Pub. Date: Nov. 18, 2004

(65) Prior Publication Data

US 2007/0032372 A1 Feb. 8, 2007

(30) Foreign Application Priority Data

Apr. 30, 2003 (FR) .................. 03 05470

(51) Int. Cl.
*B01J 27/02* (2006.01)
*B01J 27/043* (2006.01)
*B01J 27/045* (2006.01)

(52) U.S. Cl. .................. 502/216; 502/222; 502/223
(58) Field of Classification Search .............. 502/216, 502/222, 223
See application file for complete search history.

(56) References Cited

U.S. PATENT DOCUMENTS

| 5,139,990 | A | * | 8/1992 | de Jong et al. ............. 502/216 |
| 5,417,844 | A | | 5/1995 | Boitiaux et al. |
| 6,059,956 | A | | 5/2000 | Dufresne |
| 6,492,296 | B2 | * | 12/2002 | Eijsbouts ................ 502/168 |
| 7,501,376 | B2 | * | 3/2009 | Dufresne et al. ............ 502/216 |

FOREIGN PATENT DOCUMENTS

| EP | 0 466 567 A | | 1/1992 |
| EP | 0 707 890 A | | 4/1996 |
| EP | 0 904 839 A | | 3/1999 |
| WO | 2004/028691 | * | 4/2004 |

OTHER PUBLICATIONS

Hoffer B W et al.: "Characterization of Ex Situ Presulfided Ni/AL2O3 Catalysts for Pyrolysis Gasoline Hydrogenation" Journal of Catalysis, Academic Press, Duluth, MN, US, vol. 209, No. 1, Jul. 1, 2002, pp. 245-255, XP0044688868; ISSN: 0021-9517, p. 246: "Ex situ Presulfiding", table 2.

* cited by examiner

*Primary Examiner*—Patricia L Hailey
(74) *Attorney, Agent, or Firm*—Millen, White, Zelano & Branigan, P.C.

(57) ABSTRACT

The present invention concerns a process for "ex situ" treatment of a hydrogenation catalyst containing nickel prior to use, consisting of carrying out three steps, namely bringing the catalyst into contact with at least one sulphur-containing compound or agent (the step termed selectivation), treating said catalyst with hydrogen at a temperature of more than 250° C. (the step termed reduction) and passivation of said catalyst.

21 Claims, No Drawings

OFF-SITE TREATMENT FOR HYDROGENATION CATALYSTS

In the field of refining and petrochemistry, and in particular, for example, in catalytic reforming reactions or in the selective hydrogenation of gasoline, it is sometimes necessary to attenuate the activity of catalysts for a particular reaction to encourage promotion of the desired reaction. This is the case with nickel catalysts in the selective hydrogenation of diolefins in pyrolysis gasoline or in the hydrogenation of aromatic hydrocarbons. Said catalysts are so reactive that they may provoke runaway during start up with fresh catalyst or regenerated catalyst, causing startup accidents or even destroying the reactor. Thus, passivation treatments must be carried out to avoid runaway. Said treatments generally consist of irreversibly poisoning the most virulent active sites of the nickel existing on the fresh or regenerated catalyst using sulphur.

More particularly, regarding refining and hydrogenation catalysts based on nickel, iron or cobalt, suitable catalysts are sold and charged into the reactors in the form of oxides although their activated and stable form is the metallic form. In the prior art, therefore, in a first step, the oxides are reduced in the reactor (in situ) to the metallic state using hydrogen then, to overcome the disadvantages indicated above, in a second step, the activity of the catalyst is selectivated in situ by introducing a predetermined quantity of sulphur, generally 0.1% to 1.2% by weight of sulphur with respect to the catalyst weight. Generally, a sulphurized compound is used, such as carbon sulphide, mercaptans, hydrogen sulphide, thiophene compounds, sulphides and disulphides, for example dimethylsulphide, DMS, or dimethyldisulphide, DMDS. In prior art processes, reduction with hydrogen (first step) is carried out at a fairly high temperature for quite a long period (for example to reduce nickel oxide to metallic nickel, a temperature of 400° C. is used for 10 to 15 hours).

European patent EP-B1-0 466 568 describes a catalyst selectivation/pre-reduction process comprising a simultaneous step for a) impregnating the catalyst with a sulphur-containing compound and b) pre-reducing said catalyst using an organic reducing compound, thus in the absence of fresh hydrogen.

The invention can thus improve prior art techniques and use simplified conditions which are less of a constraint to the operator of the industrial unit.

In the invention described below, we carry out simultaneously or successively in a variable order, a) impregnation of the catalyst with at least one sulphur-containing agent or compound; and b) reducing said catalyst with hydrogen at high temperature (i.e. at a temperature above ambient temperature and preferably more than 250° C.) and c) either passivation, preferably oxidizing passivation, of said catalyst, or bringing said catalyst into contact with a heavy organic liquid. It is possible to conceive of carrying out the contact of this second option, if it substitutes for passivation (termed the first choice) either by storing the catalyst, which has already been selectivated and reduced, in an inert gaseous atmosphere (for example $N_2$), or by storing the catalyst in an inert heavy organic liquid (for example white oil, a gas oil or a hexadecane or any equivalent product). However, this catalyst contact possibility cannot be recommended for use on an industrial scale when large quantities of catalyst are used unless a heavy inert organic liquid is used such as a hexadecane or a heavier hydrocarbon, for example a white oil, a gas oil or any equivalent product.

Such handling, in accordance with the present invention, is carried out "ex situ", i.e. outside the reactor, which means that the operator (i.e. the refiner) does not have to carry it out himself but can have it carried out externally by a specialist in catalyst treatment, pre-conditioning or regeneration.

Then, at the end of a catalyst passivation process, the user of the catalyst, i.e. the operator or the refiner, will have the pre-treated catalyst available in his reactor or reactors and then in said reactor or reactors, i.e. "in situ", he may optionally carry out depassivation with hydrogen with the advantage of not then having to heat the catalyst to high temperatures for long periods, as is necessary when said pre-treatment is not carried out. Thus, as an example, a nickel catalyst reduced using prior art techniques has to be treated in the presence of hydrogen at 400° C. for 14 hours, or to 300° C. for 3 hours in the case of a conventional organic pre-reduction, while at the end of the process of the present invention, the operator may, for example, only have to reactivate the nickel catalyst at 150° C. for 3 hours using hydrogen.

The process of the invention concerns a process for "ex situ" treatment of a catalyst which has to be reduced prior to use, said catalyst containing at least one metal from group VIII of the periodic table and which is free of group VI metals, deposited on a support, consisting of carrying out three steps a), b), c):

a) bringing the catalyst into contact with at least one sulphur-containing agent or compound (step termed selectivation);

b) treating said catalyst with hydrogen at a temperature above ambient temperature (step termed reduction);

c) passivating said catalyst, carried out by contact with a heavy inert organic liquid or by oxidizing treatment carried out before, during or after steps a) and b).

According to the invention, catalysts are treated which are based on at least one metal from group VIII of the periodic table (said metal preferably being nickel and more particularly being in the form of nickel oxide) deposited on a suitable support, in particular alumina, in particular when said catalyst has to be reduced before use or re-use. Said catalysts are substantially free of group VI metals. Said catalysts are used in the hydrogenation of aromatic hydrocarbons and the hydrogenation of olefinic hydrocarbons. The supports on which the metal or metals employed are deposited may thus be amorphous supports (alumina, etc) or crystalline supports (zeolites, etc). The preferred support is alumina.

The invention also concerns a process for "ex situ" treatment of a catalyst prior to use or re-use of said catalyst, characterized in that it consists of carrying out three steps a), b), c), carried out in any order on said catalyst, said catalyst containing at least one metal from group VIII of the periodic table, and being substantially free of group VI metal (the catalyst preferably containing nickel, in particular in the form of a nickel oxide) deposited on a support, said three steps being as follows:

a) bringing the catalyst into contact with at least one sulphur-containing agent or compound (step termed selectivation). This step may be carried out in the presence of at least one solvent, i.e. in an aqueous or organic solution, or in suspension in an aqueous or organic solution;

b) treating said catalyst with hydrogen at a temperature above ambient temperature and preferably at 250° C. (step termed reduction);

c) passivating said catalyst, either and preferably oxidizing passivation, or by contact with a heavy organic liquid.

Thus, the catalyst is preferably essentially constituted by nickel oxide deposited on an alumina. Steps a) and b) are, for example, carried out in the order a) then b) or in the order b) then a). They may also be carried out simultaneously. Preferably, during step a), the catalytic mass is mixed with at least one solvent and at least one sulphur-containing or sulphurized agent. Said sulphur-containing or sulphurized compound or agent is selected from the group constituted by diethanoldisulphide (DEODS), DMDS (dimethyldisulphide), polysulphides and elemental sulphur.

As indicated above, our process is applicable to the treatment of hydrogenation catalysts for aromatic hydrocarbons and olefinic hydrocarbons. We should add that during step a), the degree of metal sulphurization is preferably in the range 10% to 30%. During said sulphurization, 0.05% to 10% and more particularly 0.2% to 2% of sulphur, expressed as the weight of sulphur with respect to the mass of catalyst, is preferably incorporated into the catalyst. During step b), the degree of reduction of the catalyst is preferably at least 40%.

The prior art has proposed methods for treating a catalyst comprising sulphurization, reduction and passivation of the catalyst. The Applicant's European application EP-A-0 707 890 and European application EP-A-0 904 839 may be cited in this respect. However, EP-A-0 707 890 essentially concerns a treatment of hydrotreatment catalysts for petroleum fractions, and thus the catalyst is different from that used in this case, which is a catalyst based on nickel oxide. Further, in EP-A-0 904 839, relating to passivation preceded by sulphurization, sulphurization is carried out by bringing the catalyst into contact with a sulphurized compound in the presence of hydrogen and not in solution or in suspension in an aqueous or organic solution.

More particularly, the invention is implemented as follows:

The catalyst is impregnated "offsite" (ex situ) using at least one sulphur-containing compound in the presence of at least one solvent, i.e. in an aqueous solution or an organic solution or in suspension in the aqueous or organic solution, in the range 0° C. to 50° C., preferably in the range 10° C. to 40° C., more particularly at ambient temperature except when step a) is carried out simultaneously with step b). Said impregnation is generally carried out by stirring the catalytic mass with at least one solvent and at least one sulphur-containing or sulphurized agent. Stirring is carried out using any suitable means. As an example, it is possible to use a rotary impregnator in which the solid is brought into contact progressively with the solution injected via nozzles.

As an example, the sulphur-containing or sulphurized agent used in step a) may be diethanol disulphide or 2,2-dithio-bis ethanol with formula HO—$C_2H_4$—S—S—$C_2H_4$—OH (usually known as DEODS) or DMDS (dimethyldisulphide). Said disulphides may optionally be used as a mixture with elemental sulphur, in particular as a powder. Polysulphides such as di-tertiododecylpolysulphide (TPS 32 from ATOFINA) or di-tertiononylpolysulphide (TPS 37 from ATOFINA), preferably in solution in a solvent, may be used.

When no solution or aqueous suspension is used, but an organic solution or suspension, the preferred organic solvent is a white spirit as defined in the Applicant's United States patent U.S. Pat. No. 4,530,917, or optionally any other suitable solvent such as an alcohol or polyalcohol, glycol or polyglycol, or an aliphatic or aromatic solvent.

At the end of step a), it may be advantageous to eliminate at least the major portion of the solvent used: then, when the impregnation described above is terminated, it is then possible to carry out a heat treatment of the catalytic mass between 100° C. and 200° C., generally between 130° C. and 170° C., and more particularly at about 150° C., for 30 minutes to 3 hours, preferably for about 1 to 2 hours, to eliminate the major portion of the solvent. Preferably, a moving bed furnace is used. As an example, a rotary furnace of the louvre furnace type described in the Applicant's patent U.S. Pat. No. 4,551,437 or of the Louisville furnace type (described in the Applicant's French patent FR-A-2 649 623), may be used.

To carry out reduction of the catalyst (step b)), the catalyst is generally reduced in hydrogen, for example in a rotary furnace, between 250° C. and 600° C., generally between 350° C. and 500° C., and more particularly at about 450° C. for 2 to 4 hours.

During step c), the catalyst is preferably passivated to allow handling in air. In said step c), oxidizing passivation of the catalyst is advantageously carried out. Said oxidizing passivation is carried out by partial and superficial oxidation of reduced metal atoms of the catalyst and preferably in a bed in motion, for example a moving bed or a rotary furnace. Said oxidation is carried out by bringing the catalyst bed into contact with a partial pressure of oxygen in an inert gas, for example nitrogen. Said partial pressure may initially be in the range 1% to 20% of oxygen (or 0.001 or 0.02 MPa), preferably 5% $O_2$. Said partial pressure is progressively increased until it reaches the nominal value for oxygen in air. Said passivation is carried out between 0° C. and 150° C. and preferably between 20° C. and 120° C. The passivated catalyst may be left in the open air.

An alternative to oxidizing passivation is to immerse the catalyst in a heavy inert liquid, such as hexadecane or a paraffin oil which is free of impurities. This technique means that the active sites constituted by metallic nickel cannot react too rapidly with the oxygen in air. However, the examples will show that this technique only works on an industrial scale to handle large quantities of catalyst if said inert liquid is sufficiently heavy.

When the catalyst which has undergone the three steps a), b) and c) (said catalyst the initial activity of which has been selectivated by poisoning the most active sites) is ready to be delivered to the user (operator or refiner), it can then be used "in situ", i.e. in the reaction zone in which the catalyst is to be used subsequently, and then it is optionally possible to reactivate the catalyst in hydrogen, for example for a nickel-based catalyst, between 100° C. and 250° C. for 2 to 4 hours, preferably between 150° C. and 200° C. for 2 to 3 hours.

The process is applicable to the treatment of a catalyst based on at least one oxide of an active metal (deposited on an amorphous or crystalline matrix) the selectivity of which is to be modified by poisoning at least a portion of its active sites, for example with a sulphur-containing agent, during which process a substantial part of said metal oxide is transformed ex situ into the metallic element and/or potentially, part of the reduced metal is partially and superficially re-oxidized to enable the catalyst to be handled in air, at the end of which process the catalyst is reactivated in situ in the presence of hydrogen at a temperature and for a period which is much lower/shorter than the temperature and duration which would have been necessary if the multi-step process of the invention had not been carried out.

EXAMPLE 1

Comparison: Absence of Sulphur

A commercial Ni/Alumina type catalyst containing 24% by weight of NiO was impregnated with white spirit as described above to fill 70% of the pore volume (i.e. 0.7 ml per gram of catalyst). The impregnated catalyst was left for one hour in a rotary drum in the cold then for 2 h at 150° C. to evaporate the hydrocarbons. The dried catalyst was treated in a traversed bed at 450° C. in a vertical furnace with pure hydrogen for 4 h to reduce the non-sulphurized nickel and eliminate the hydrocarbons. At the end of the activation period, and still in the rotary drum, the system was cooled and purged for 4 hours in nitrogen and flushed, generally at ordinary temperatures, with a mixture of 1% oxygen in nitrogen for 2 hours, then with 5% oxygen for 2 hours, then with air for one hour. Catalyst A was obtained.

EXAMPLE 2

Comparison: Absence of Reduction Phase

A commercial Ni/Alumina type catalyst containing 24% by weight of NiO was sulphurized, generally at ordinary temperature, with amounts of sulphur corresponding to 22% of the theoretical stoichiometric value of the sulphide $Ni_3S_2$. A stoichiometry of 100% corresponds to 6.81% by weight of sulphur, expressed as the dry matter corrected for loss by combustion.

Said catalyst was impregnated with a solution of di-tertionyl polysulphide dissolved in white spirit. 6 g of TPS 37 mixed with 56 g of white spirit was added to 250 g of catalyst as described above. Catalyst B was obtained. It had only undergone one step for impregnation of the sulphurized compound, step a).

The impregnated catalyst B was left for one hour in a rotary drum in the cold then 2 h at 150° C. to evaporate the hydrocarbons and fix the sulphur of the organic polysulphide. At the end of the drying period, the system was cooled and purged for 4 hours in nitrogen and flushed with a mixture of 1% oxygen in nitrogen for 2 hours, then with 5% oxygen for 2 hours then with air for one hour. Catalyst C was obtained, which had underwent steps a), sulphurization, and c), passivation.

EXAMPLE 3

In Accordance with the Invention: Steps a), b) and c) in Succession

Catalyst B which had thus undergone step a) was activated in hydrogen in a rotary tube furnace under the following conditions: temperature 450° C.; time 6 h; gas 100% hydrogen; pressure normal.

At the end of the activation period, the system was cooled, purged for 4 hours in nitrogen and flushed with a mixture of 1% oxygen in nitrogen for 2 hours, then 5% oxygen for 2 hours, then air for one hour. Catalyst D was obtained which had undergone steps a), sulphurization, b), reduction and c), passivation, in succession.

EXAMPLE 4

In Accordance with the Invention: Steps a), b) and c') in Succession

Catalyst B which had thus undergone step a) was activated in hydrogen in a rotary tube furnace under the following conditions: temperature 450° C.; time 6 h; gas 100% hydrogen; pressure normal.

At the end of the activation period, the system was cooled and purged for 4 hours in nitrogen. At this stage, the catalyst which had undergone steps a), sulphurization, and b), reduction, was brought into contact with a heavy white oil type hydrocarbon (Marcol 82 from Exxon Mobil) to fill the entire pore volume of said catalyst. The quantity of oil employed was 58 g per 100 g of catalyst. Catalyst E was obtained which had undergone steps a), sulphurization, b), reduction and c'), passivation, in succession.

EXAMPLE 5

In Accordance with the Invention: Steps b), c) and a) in Succession

The same commercial catalyst as described in Example 2 was reduced in hydrogen in a rotary tube furnace under the following conditions: temperature 450° C.; time 6 h; gas 100% hydrogen; pressure normal. It was then passivated by being cooled and purged for 4 hours in nitrogen then flushed with a mixture of 1% oxygen in nitrogen for 2 hours, then 5% oxygen for 2 hours then air for one hour. The passivated reduced catalyst was treated with 6 g of TPS 37 and 56 g of white spirit per 250 g of catalyst, as described in Example 3. The impregnated catalyst was left for one hour in a rotary drum in the cold then heated for 2 h at 150° C. to evaporate off the hydrocarbons and fix the sulphur of the organic polysulphide. Catalyst F was obtained which had undergone steps b), reduction, c), passivation and a), sulphurization in succession.

EXAMPLE 6

In Accordance with the Invention: Steps b), a) and c) in Succession

The same commercial catalyst as described in Example 2 was reduced in hydrogen in a rotary tube furnace under the following conditions: temperature 450° C.; time 6 h; gas 100% hydrogen; pressure normal.

At the end of the reduction in hydrogen phase b), the catalyst based on metallic nickel was purged and cooled under nitrogen for 4 hours. During this purge/cooling in nitrogen step, DMDS was nebulized onto the catalyst. The mass flow rate of DMDS (0.6 g/hr per 100 g of catalyst) was determined so that during 4 hours of catalyst purge/cooling, the quantity of sulphur introduced was 1.5 g per 100 g of reduced catalyst.

After this sulphurization step a), the reduced and sulphurized catalyst was passivated with a mixture of nitrogen and air containing 1% oxygen in nitrogen for 2 hours, then 5% oxygen for 2 hours then air for one hour.

Catalyst G was obtained which had undergone steps b), reduction, a), sulphurization and c), passivation, in succession.

EXAMPLE 7

In accordance with the Invention: Steps a)-b) Simultaneously, then c)

The commercial catalyst described in Example 2 was reduced in hydrogen in a rotary tube furnace. Simultaneously with the introduction of hydrogen, TPS 37 was sprayed into the furnace using a dosing pump. The following treatment conditions were employed: temperature 450° C.; time 6 h; gas 100% hydrogen; pressure normal. The TPS37 flow rate was 40.5 g/h per 1 kg/h of catalyst.

At the end of the simultaneous sulphurization reduction step, the catalyst based on metallic nickel was purged and cooled in nitrogen for 4 hours. The reduced and sulphurized catalyst was then passivated using a mixture of nitrogen and air containing 1% oxygen in nitrogen for 2 hours, then 5% oxygen for 2 hours then air for one hour.

Catalyst H was obtained which had simultaneously undergone steps a), sulphurization and b), reduction, and finally step c), passivation.

EXAMPLE 8

Comparison: Steps a), b) in Succession with Step c), Not in Accordance

Catalyst B which had thus undergone step a), sulphurization, was activated in hydrogen as in Example 3. At the end of the activation period, the product was poured into heptane in an inert atmosphere with no passivation step. Non passivated catalyst I was obtained, stored in heptane. The product was tested like the other catalysts. It will be seen that the organic liquid used (heptane) was not heavy enough, in contrast to Example 4 in which c') was carried out in the presence of a heavy hydrocarbon.

EXAMPLE 9

Characterization Tests

The sulphurized, reduced, passivated or non passivated catalysts were characterized by:

sulphur analysis (as is and after toluene leaching), a magnetic measurement of the degree of reduction $Ni^0$ and a nickel weight balance to discern the degrees of reduction (number of metallic nickel atoms divided by the total number of nickel atoms), degree of sulphurization (number of atoms of nickel bonded to sulphur, assuming a stoichiometry of the $Ni_3 S_2$ type divided by the total number of nickel atoms) and the degree of passivation (number of atoms of nickel in the form NiO divided by the total number of nickel atoms);

a determination of the self-heating nature of the catalysts to quantify the passivation efficacy: the temperature to which the catalyst has to be heated so that its intrinsic temperature exceeds 200° C. ($T_1$);

maximum temperature observed when the catalyst was left in air after depassivation at 150° C. in hydrogen for 4 h ($T_2$). A large elevation in temperature is characteristic of sufficient depassivation;

a catalytic test using 2 reactions:
   a) hydrogenation of aromatics (for example toluene conversion). A model reaction is selected, namely toluene hydrogenation, under the following conditions: 10% by weight of toluene in heptane—temperature: 70° C.; pressure: 30 bars—hourly space volumetric: 2 $h^{-1}$ (2 liters of feed per liter of catalyst per hour);
   b) hydrogenation of diolefins, measured using a pyrolysis gasoline by the variation in the MAV (maleic anhydride index, characteristic of the diolefins content) under the following conditions: pressure: 30 bars—temperature: 100° C.—hourly space volumetric: 8 $h^{-1}$—feed MAV: 87.

The catalytic tests were carried out on samples depassivated in situ using a treatment in hydrogen at 150° C. for 4 h. The results are summarized in the table below.

Catalyst A was not selective and converted too much toluene as the too highly reactive nickel atoms had not been passivated with sulphur. Catalyst C was not active for diolefin hydrogenation as the metallic Ni phase was not present. Catalysts D, F, G and H were active and selective. D underwent steps a), b) and c), F underwent steps b), c) and a), G underwent steps b), a) and c), H underwent steps ab) and c). Catalyst E was active and selective. E underwent steps a), b) and c'). Step c') was a step for passivation with white oil. Catalyst I produced satisfactory results in terms of activity and selectivity. However, in contrast to catalyst E, catalyst I was strongly self-heating. While it could be handled in air with care on a small laboratory scale, safety problems would arise on an industrial scale with a light solvent such as heptane impregnated into its pores.

The invention claimed is:

1. A process for "ex situ" treatment of a catalyst which has to be reduced prior to use, said catalyst containing at least one metal from group VIII of the periodic table and which is free of group VI metals, deposited on a support, comprising carrying out three steps a), b), c):
   a) bringing the catalyst into contact with at least one sulphur-containing agent or compound so as to provide a degree of metal sulfurization of 10-30%;
   b) subjecting said catalyst to reduction with hydrogen at a temperature above ambient temperature;
   c) passivating said catalyst, carried out by contact with a heavy inert organic liquid or by oxidizing treatment, said passivating being conducted after step (a) when preceded by step (b) or after step (b) when preceded by or simultaneous with step (a).

2. A process according to claim 1, in which the heavy inert organic liquid comprises a white oil, a gas oil or a hexadecane.

3. A process according to claim 2, in which the degree of reduction of the catalyst prior to passivation is at least 40%.

4. A process according to claim 1, in which the catalyst contains nickel.

5. A process according to claim 1, in which the catalyst contains nickel deposited on a support and in which the three steps are as follows:
   a) bringing the catalyst into contact with at least one sulphur-containing agent or compound, the step being carried out in the presence of at least one solvent;

|  | Example | | | | | | | |
| --- | --- | --- | --- | --- | --- | --- | --- | --- |
|  | 1 | 2 | 3 | 4 | 5 | 6 | 7 | 8 |
| Catalyst | A | C | D | E | F | G | H | I |
| Number of steps* | 2 | 2 | 3 | 3 | 3 | 3 | 3 | 2 |
| Step and chronology | b) | a) | a) | a) | b) | b) | ab) | a) |
|  | c) | c) | b) | b) | c) | a) | c) | b) |
|  |  |  | c) | c') | a) | c) |  |  |
| Wt % sulphur in crude (%) | 0 | 1.5 | 1.5 | 1.5 | 1.5 | 1.4 | 1.6 | 1.5 |
| Wt % sulphur in leachate (%) | 0 | 1.5 | 1.5 | 1.5 | 1.5 | 1.4 | 1.4 | 1.5 |
| Degree of sulphurization (%) | 0 | 22 | 22 | 22 | 22 | 21 | 21 | 22 |
| Degree of reduction | 75 | 0 | 60 | 75 | 62 | 65 | 70 | 75 |
| Degree of passivation (%) | 20 | NA | 15 | 0 | 13 | 15 | 16 | 0 |
| $T_1$ (° C.) | 180 | >200 | 190 | >200 | 25 | 185 | 190 | 25 |
| $T_2$ (° C.) | 304 | 25 | 315 | 25 | 310 | 307 | 305 | 310 |
| Toluene conversion (wt %) | 16 | 0 | 0 | 0 | 0 | 4 | 2 | 0 |
| MAV of product obtained | 21 | 83 | 40 | 42 | 41 | 41 | 41 | 41 |

*excluding in situ reactivation step prior to final use.
a) selective sulphurization step;
b) hot reduction step in hydrogen;
c) oxidizing passivation step;
d) oil passivation step.

b) treating said catalyst with hydrogen at a temperature above ambient temperature;

c) oxidizing passivation of said catalyst.

6. A process according to claim 5, in which at the end of step a), comprising removing at least the major portion of the solvent used for contacting the catalyst with the sulphur-containing or sulphurized compound or agent.

7. A process according to claim 1, in which the catalyst is constituted by nickel oxide deposited on an alumina.

8. A process according to claim 1, in which the steps are in the order a) then b) then c).

9. A process according to claim 8, in which, at the end of steps a), b) and c), said catalyst is reactivated with hydrogen "in situ".

10. A process according to claim 8, in which the degree of reduction of the catalyst prior to passivation is at least 40%.

11. A process according to claim 1, in which the steps are in the order b) then a) then c).

12. A process according to claim 11, in which the degree of reduction of the catalyst prior to passivation is at least 40%.

13. A process according to claim 1, in which steps a) and b) are carried out simultaneously and are followed by step c).

14. A process according to claim 13, in which the degree of reduction of the catalyst prior to passivation is at least 40%.

15. A process according to claim 1, in which during step a), the catalytic mass is stirred with at least one solvent and at least one sulphurizing agent at a temperature of 0-50° C. to form a solution or suspension.

16. A process according to claim 15, in which, in step a), said solvent is an alcohol, a polyalcohol, a glycol or a polyglycol.

17. A process according to claim 1, in which reduction step b) is carried out in hydrogen between 250° C. and 600° C.

18. A process according to claim 1, comprising conducting said step c), oxidizing passivation of the selectivated and reduced catalyst at between 0° C. and 150° C. in a moving bed, at a partial pressure of oxygen which is initially in the range 0.001 to 0.02 MPa and which is progressively increased to the ambient value of oxygen in air.

19. A process according to claim 1, in which said sulphur-containing agent or compound comprises diethanoldisulphide (DEODS), DMDS, at least one polysulphide or elemental sulphur.

20. A process according to claim 1, in which the degree of reduction of the catalyst prior to passivation is at least 40%.

21. In a process for the catalytic hydrogenation of aromatic or olefinic hydrocarbons, the improvement wherein the catalyst is produced according to the process of claim 1.

* * * * *